United States Patent
Chan et al.

(10) Patent No.: US 9,979,655 B2
(45) Date of Patent: May 22, 2018

(54) CONNECTED-MODE TRAFFIC BASED IDLE-MODE LOAD BALANCING

(71) Applicant: Verizon Patent and Licensing Inc., Arlington, VA (US)

(72) Inventors: Yee Sin Chan, San Jose, CA (US); Zheng Zhao, Plainsboro, NJ (US); Jignesh S. Panchal, Hillsborough, NJ (US); Arda Aksu, Martinez, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 349 days.

(21) Appl. No.: 14/757,496

(22) Filed: Dec. 23, 2015

(65) Prior Publication Data

US 2017/0187628 A1 Jun. 29, 2017

(51) Int. Cl.
*H04L 12/803* (2013.01)
*H04W 72/04* (2009.01)
*H04W 28/02* (2009.01)

(52) U.S. Cl.
CPC ....... *H04L 47/125* (2013.01); *H04W 28/0252* (2013.01); *H04W 72/0453* (2013.01)

(58) Field of Classification Search
CPC combination set(s) only.
See application file for complete search history.

(56) References Cited

U.S. PATENT DOCUMENTS

| | | | |
|---|---|---|---|
| 9,860,780 B2* | 1/2018 | Beale | H04W 28/0215 |
| 2011/0292856 A1* | 12/2011 | Park | H04W 68/00 370/311 |
| 2013/0122921 A1* | 5/2013 | Juppi | H04W 72/048 455/450 |
| 2015/0131441 A1* | 5/2015 | Huang | H04W 28/08 370/235 |
| 2015/0249989 A1* | 9/2015 | Aksu | H04W 28/0252 455/453 |
| 2015/0358967 A1* | 12/2015 | Xie | H04W 72/0453 370/329 |
| 2017/0230865 A1* | 8/2017 | Chan | H04W 28/08 |

FOREIGN PATENT DOCUMENTS

CN 106550462 A * 3/2017

OTHER PUBLICATIONS

Alcatel-Lucent, "Idle UE Distribution in Macro Only System and HetNets", Verizon, 3GPP TSG-RAN WG2 Meeting #86, R2-142495, Agenda Item: 7.11.1, May 23, 2014, 6 pages.

* cited by examiner

*Primary Examiner* — Mounir Moutouakil (57) ABSTRACT

A device may determine first information associated with a plurality of carriers. The first information may be associated with a plurality of user devices connected to a base station via the plurality of carriers. The device may determine second information associated with the plurality of carriers. The second information may be associated with a plurality of user devices camping on the plurality of carriers. The device may selectively perform load balancing in association with the plurality of user devices camping on the plurality of carriers based on the first information and the second information.

20 Claims, 5 Drawing Sheets

CONNECTED-MODE TRAFFIC BASED IDLE-MODE LOAD BALANCING

BACKGROUND

A user device operating in an idle mode may not have a connection established with a base station. Rather, the user device may camp on a particular radio frequency band (herein referred to as a carrier) that the user device may use when initiating a connection at a future time.

DETAILED DESCRIPTION OF PREFERRED EMBODIMENTS

The following detailed description of example implementations refers to the accompanying drawings. The same reference numbers in different drawings may identify the same or similar elements.

Operator networks (e.g., mobile wireless networks) have experienced growth in both the number of devices connecting to operator networks and the amount of traffic over the operator networks. An operator network may support multiple carriers, and may attempt to load balance the traffic across the multiple carriers to improve the overall network performance and user experience (e.g., compared to minimizing the traffic on any one carrier).

For example, the operator network may perform load balancing, associated with the multiple carriers, for user devices with connections (e.g., Radio Resource Control (RRC) connections) to a base station included in the operator network (i.e., when the user devices are in a connected-mode). Performing load balancing of connected-mode user devices may be referred to as connected-mode load balancing.

As another example, the operator network may perform load balancing, associated with the multiple carriers, for user devices without connections to the base station (i.e., when the user devices are in idle-mode such that the user devices are camping on the multiple carriers). Performing load balancing of idle-mode user devices may be referred to as idle-mode load balancing. Connected-mode load-balancing and idle-mode load balancing may be performed independently. In other words, connected-mode load balancing and idle-mode load balancing may be performed separately for a set of connected-mode user devices and a set of idle-mode user devices, respectively.

When performing connected-mode load balancing, the base station may store or have access to information associated with, for example, quality of service requirements, mobile capability, network radio resources utilization, system capability, or the like, and may use such information to load balance connected-mode user devices by causing a number of the connected-mode user devices to be reallocated (e.g., to switch) from a first carrier (e.g., a more congested carrier) to a second carrier (e.g., a less congested carrier). Similarly, connected-mode load balancing may be used in a hotspot deployment scenario (e.g., where there exists a capacity layer, associated with a first carrier, that is configured to cover a smaller, high traffic area, and a coverage layer, associated with a second carrier, that is configured to cover a larger area and providing mobility support). In this case, performance of the connected-mode load balancing could, for example, be used to allocate more connected-mode user devices to the capacity layer while located in the area associated with the capacity layer (e.g., as compared to the coverage layer). In either case, the base station may store or have access to sufficient information, associated with the connected-mode user devices, in order to perform connected-mode load balancing associated with the multiple carriers.

However, unlike connected-mode load balancing, the base station may have difficulty determining whether idle-mode user devices should be reallocated across the multiple carriers. For example, the idle-mode user devices do not send or receive a significant amount of information and/or consume a significant amount of network resources (e.g., as compared to connected-mode user devices). As such, the base station may have limited or no information associated with the idle-mode user devices (i.e., the base may be unable to determine a number of idle-mode user devices camping on each carrier). Therefore, idle-mode load balancing may not be utilized at all, as often, or appropriately as often as connected-mode load balancing by the network operator.

Nonetheless, with increasing numbers of network connections involving small amounts of traffic (e.g., repeated establishment of RRC connections for exchange of small amounts of traffic), idle-mode load balancing may be useful to increase performance of the operator network. For example, idle-mode load balancing may be useful where a number of idle-mode user devices camping on a carrier is enough such that a channel associated with accessing the operator network (e.g., a random-access channel (RACH) channel) is congested and/or a signaling capability (e.g., a RRC signaling capability) of the base station is overloaded. This may lead to blocking of access of idle-mode user devices to the network. An unbalanced allocation of idle-mode user devices across the multiple carriers may also increase a number of inter-frequency handovers (e.g., due to connected-mode load balancing being performed when the idle-mode user devices become RRC-connected to the carriers on which the idle-mode user devices are camped).

Implementations described herein may allow a base station to determine whether to perform idle-mode load balancing, associated with idle-mode user devices camping on multiple carriers of an operator network, based on a load balancing of connected-mode user devices associated with the multiple carriers, and perform the idle-mode load balancing as needed. Basing the idle-mode load balancing on the load balancing of the connected-mode user devices may lead to improved operator network performance by, for example, reducing congestion associated with providing the idle-mode user devices with access to the operator network, reducing blocking of the idle-mode user devices from accessing the operator network, reducing a number of inter-frequency handovers between the multiple carriers (e.g., when the idle-mode user devices become connected-mode user devices), or the like.

Figure 1A:
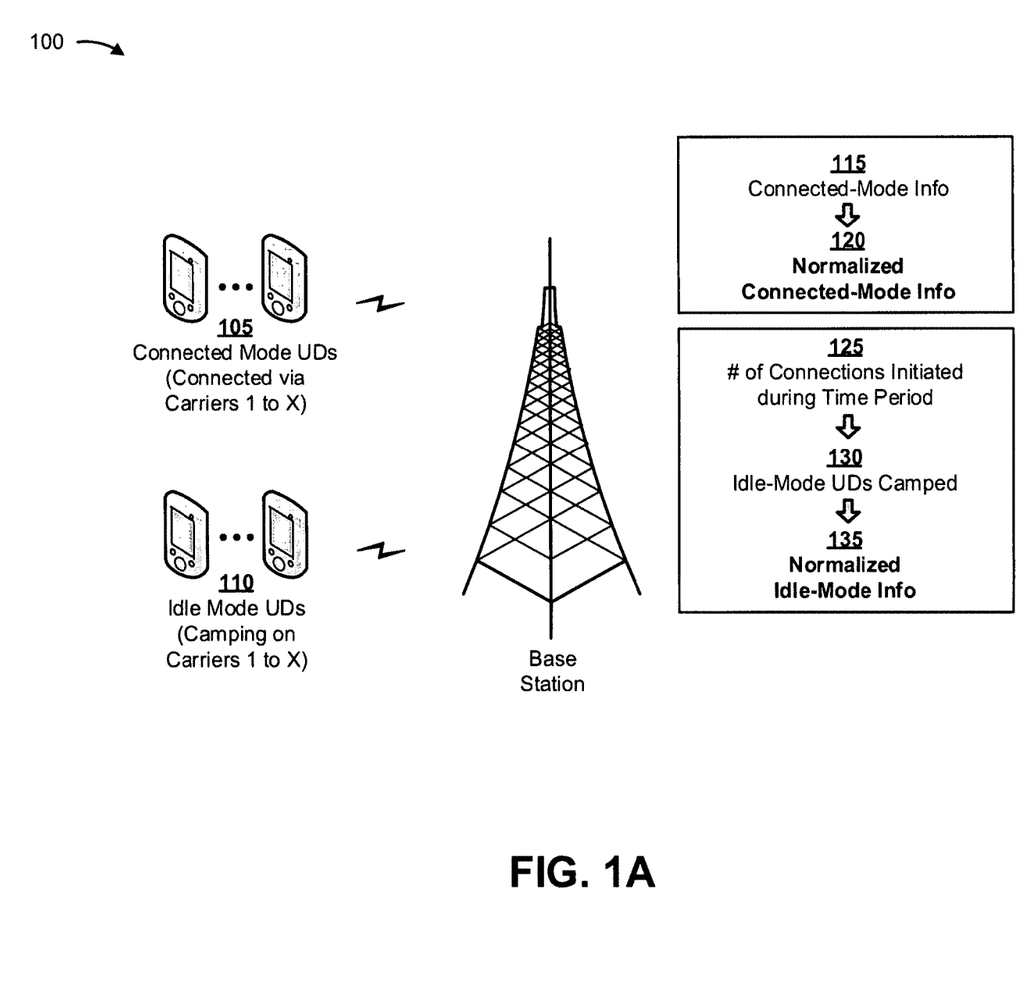
FIGS. 1A and 1B are diagrams of an overview of an example implementation described herein.
Figure 1B:
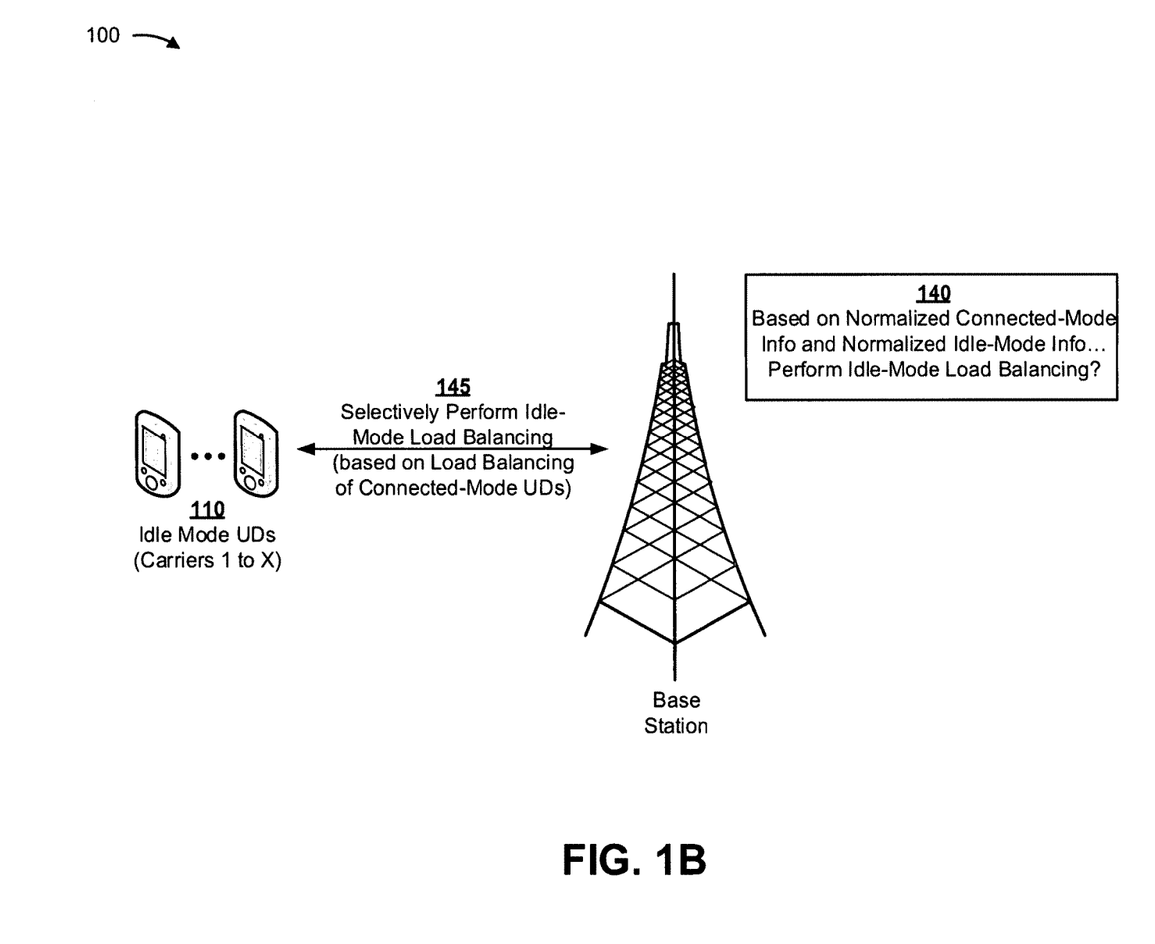

FIGS. 1A and 1B are diagrams of an overview of an example implementation 100 described herein. As shown by reference number 105 of FIG. 1A, a set of connected-mode user devices may be connected to a base station via a set of carriers (e.g., carrier 1 to carrier X). As shown by reference number 110, a set of idle-mode user devices may be camping on the set of carriers (e.g., without being connected to the base station). For the purposes of example implementation 100, assume that the base station receives (e.g., based on a configuration of the base station, based on information received from another device, etc.) an indication that the base station is to selectively perform idle-mode load balancing of the idle-mode user devices.

As shown by reference number 115, the base station may determine connected-mode information associated with the set of connected-mode user devices. The connected-mode information may include information associated with the set of connected-mode user devices connected to the base station via the set of carriers. For example, the connected-mode information may include information that identifies an amount of traffic sent and/or received by the base station via each carrier (e.g., per unit of time), information that identifies a number of connected-mode user devices connected to the base station via each carrier, information that identifies a relationship between the amount of the traffic, sent and/or received by the base station via each carrier, and a total amount of traffic sent and/or received by the base station via the set of carriers, or the like As shown by reference number 120, the base station may calculate normalized connected-mode information based on the connected-mode information. The normalized connected-mode information may include connected-mode information that has been normalized in order to permit comparison of the connected-mode information to other information, such as normalized idle-mode information (e.g., for the purpose of determining whether to perform idle-mode load balancing and/or for the purpose of performing idle-mode load balancing, as described below).

As shown by reference number 125, the base station may determine connection initiation information associated with the set of carriers. The connection initiation information may include information associated with a number of connections initiated with the base station via each carrier during a period of time.

As shown by reference number 130, the base station may determine idle-mode information based on the connection initiation information. The idle-mode information may include information associated with a set of idle-mode user devices estimated to be camping on each carrier. For example, the idle-mode information may include an estimated number of idle-mode user devices camping on each carrier. In some implementations, the idle-mode information may include an estimated number of idle-mode user devices since the base station may not store, have access to, or be capable of determining, an actual number of idle-mode user devices camping on each carrier. In some implementations, the base station may determine the idle-mode information based on the connection initiation information.

As shown by reference number 135, the base station may calculate normalized idle-mode information based on the idle-mode information. The normalized idle-mode information may include idle-mode information that has been normalized in order to permit comparison of the idle-mode information to other information, such as the normalized connected-mode information.

As shown in FIG. 1B, and by reference number 140, the base station may determine whether to perform idle-mode load balancing based on the normalized connected-mode information and the normalized idle-mode information. For example, the base station 215 may determine whether a difference between normalized connected-mode information, associated with one or more carriers of the set of carriers, and normalized idle-mode information, associated with the one or more carriers of the set of carriers, satisfies a load balancing threshold. Here, if the difference satisfies the load balancing threshold, then the base station may determine that the base station is to perform idle-mode load balancing associated with one or more carriers. Alternatively, if the difference does not satisfy the load balancing threshold, then the base station may determine that the base station is not to perform idle-mode load balancing associated with one or more carriers.

As shown by reference number 145, if the base station determines that idle-mode load balancing is to be performed for one or more carriers, then base station may perform the idle-mode load balancing. In some implementations, the base station may perform the idle-mode load balancing such that the allocation of the set of idle-mode user devices across the set of carriers matches (e.g., exactly, within a threshold, etc.) the load balancing of the set of connected-mode user devices across the set of carriers. In other words, the base station may perform idle-mode load balancing of the idle-mode user devices based on the load balancing of the connected-mode user devices.

In this way, a base station may determine whether to perform idle-mode load balancing, associated with the set of idle-mode user devices camping on the set of carriers of the operator network, based on a load balancing of the connected-mode user devices associated with the set of carriers, and may perform the idle-mode load balancing based on the load balancing of the connected-mode user devices as needed.

As indicated above, FIGS. 1A and 1B are provided merely as examples. Other examples are possible and may differ from what was described with regard to FIGS. 1A and 1B.

Figure 2:
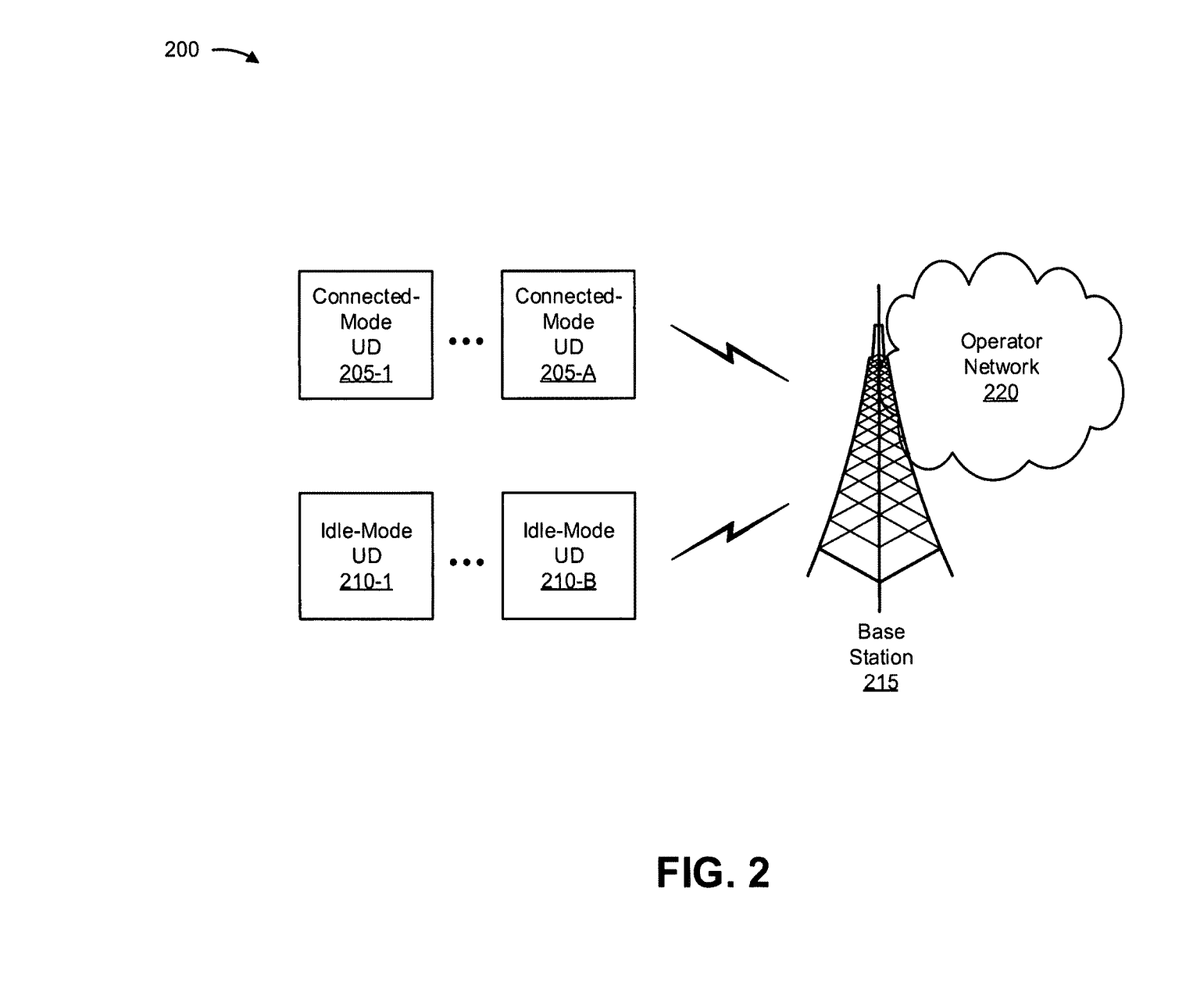
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include connected-mode user devices 205-1 through 205-A (A>1) (hereinafter referred to collectively as connected-mode user devices 205, and individually as connected-mode user device 205), idle-mode user devices 210-1 through 210-B (B>1) (hereinafter referred to collectively as idle-mode user devices 210, and individually as idle-mode user device 210), a base station 215, and an operator network 220. Devices of environment 200 may interconnect via wired connections, wireless connections, or a combination of wired and wireless connections.

Connected-mode user device 205 may include a device, operating in a connected-mode, that is capable of receiving, generating, storing, processing, and/or providing information (e.g., via base station 215). For example, connected-mode user device 205 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, connected-mode user device 205 may be connected to base station 215 via a carrier associated with operator network 220. In some implementations, connected-mode user device 205 may be capable of switching from the connected-mode to the idle-mode (e.g., such that connected-mode user device 205 becomes an idle-mode user device 210) when, for example, the connection with base station 215 is torn down.

Idle-mode user device 210 may include a device, operating in an idle-mode, that is capable of receiving, generating, storing, processing, and/or providing information (e.g., via base station 215). For example, idle-mode user device 210 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, idle-mode user device 210 may be camped on a carrier, associated with operator network 220, without being connected to base station 215. In some implementations, idle-mode user device 210 may be capable of switching from the idle-mode to the connected-mode (e.g., such that idle-mode user device 210 becomes a connected-mode user device 205) when, for example, idle-mode user device 210 establishes a connection with base station 215.

Base station 215 may include one or more devices capable of communicating with connected-mode user device 205 and/or idle-mode user device 210 using a cellular radio access technology. For example, base station 215 may include a base transceiver station, a radio base station, a node B, an evolved node B (eNB), a base station subsystem, a cellular site, a cellular tower (e.g., a cell phone tower, a mobile phone tower, etc.), a radio access node, a macrocell base station, a microcell base station, a picocell base station, a femtocell base station, or a similar type of device. Base station 215 may transfer traffic between connected-mode user device 205 and/or idle-mode user device 210 and a network (e.g., the Internet). In some implementations, base station 215 may communicate with connected-mode user device 205 and/or idle-mode user device 210 (and/or one or more other devices) via a set of carriers associated with operator network 220.

Operator network 220 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations (e.g., base station 215) via which connected-mode user devices 205 and/or idle-mode user devices 210 communicate with the EPC. The EPC may include a serving gateway (SGW), a mobility management entity device (MME), and/or a packet data network gateway (PGW) that enables connected-mode user devices 205 and/or idle-mode user devices 210 to communicate with and/or access a network and/or an Internet protocol (IP) multimedia subsystem (IMS) core. The IMS core may include a home subscriber server (HSS)/authentication, authorization, accounting (AAA) server, a policy and charging rules function (PCRF) server, and/or a call session control function (CSCF) server and may manage certain information and services, such as authentication, session initiation, account information, and/or a user profile, associated with connected-mode user devices 205 and/or idle-mode user devices 210. The LTE network may include multiple base stations 215, and the EPC may include multiple SGWs, MMEs, and/or PGWs. Additionally, or alternatively, operator network 220 may include a CDMA network, a public land mobile network (PLMN), a second generation (2G) network, a third generation (3G) network, a fourth generation (4G) network, a fifth generation (5G) network, and/or a similar type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
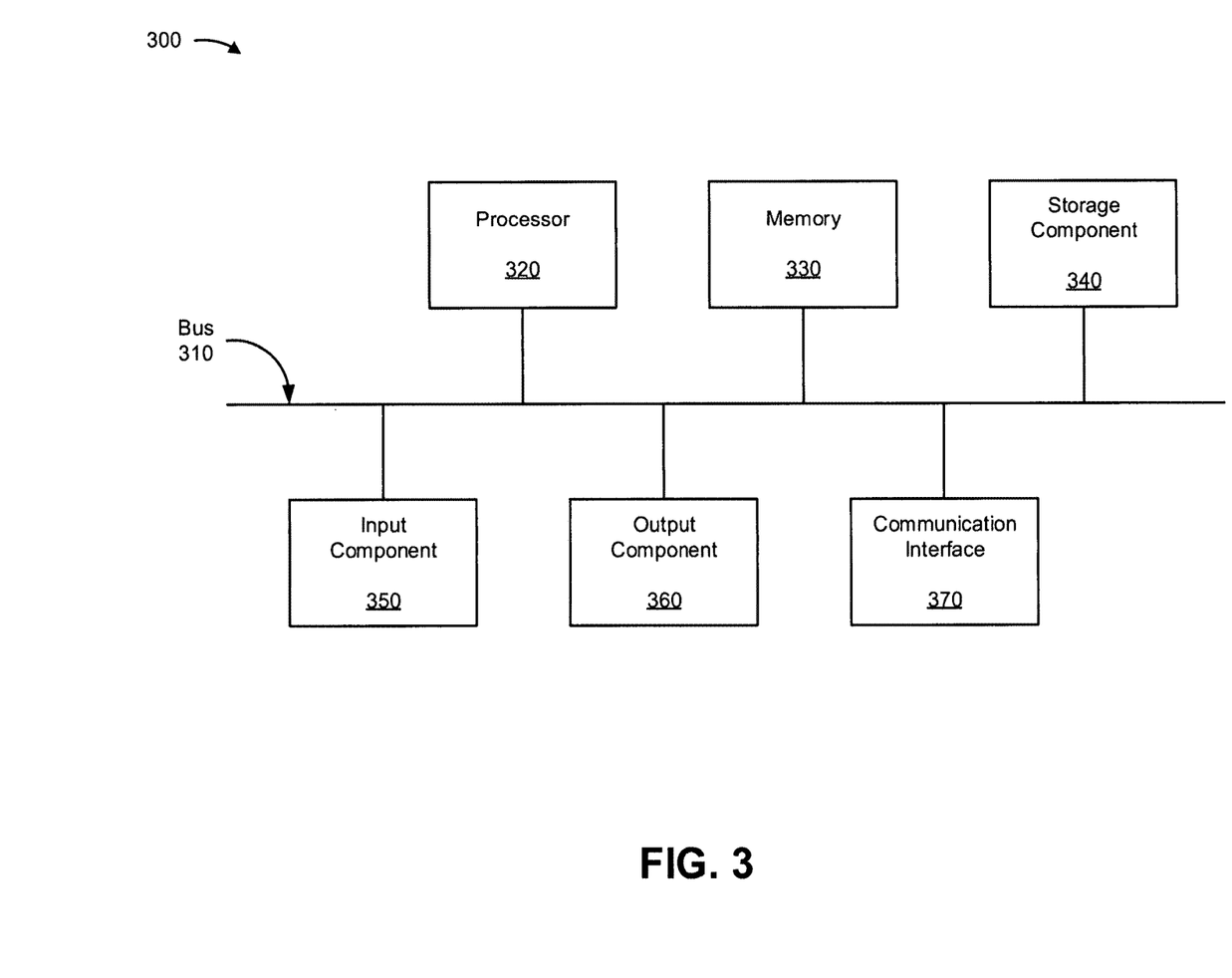
FIG. 3 is a diagram of example components of one or more devices of FIG. 2.

FIG. 3 is a diagram of example components of a device 300. Device 300 may correspond to connected-mode user device 205, idle-mode user device 210, and/or base station 215. In some implementations, connected-mode user device 205, idle-mode user device 210, and/or base station 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
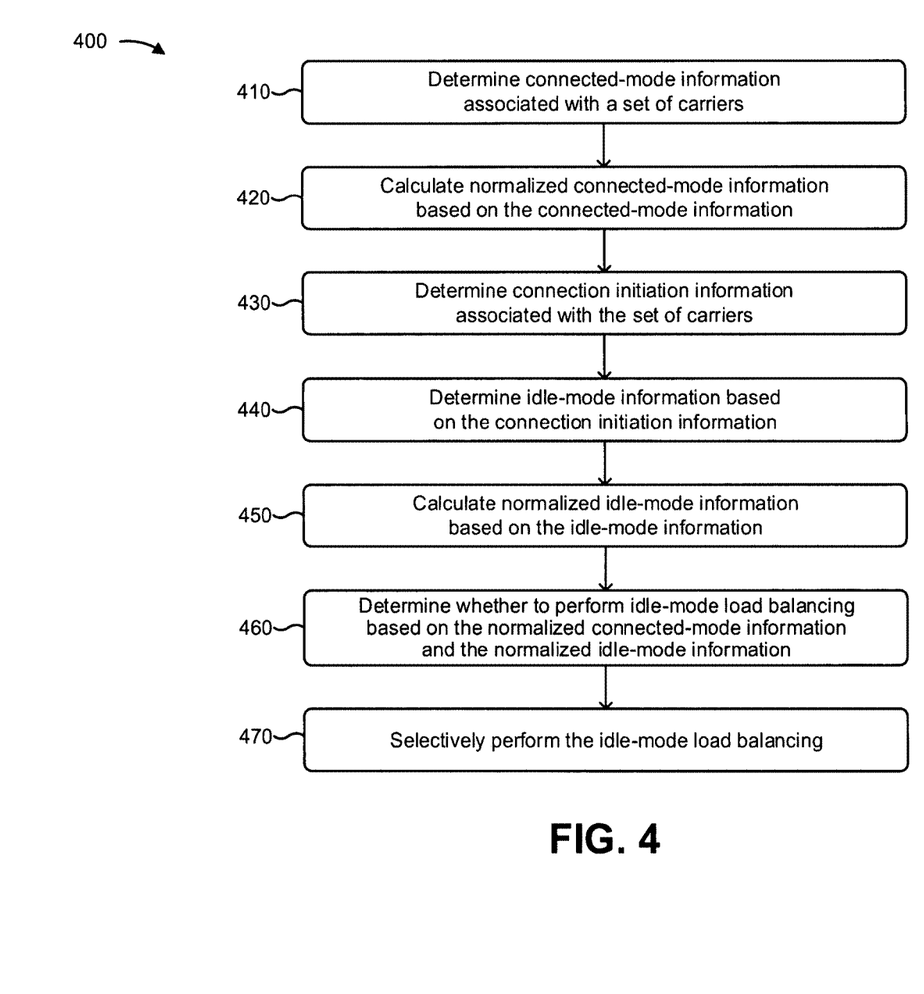
FIG. 4 is a flow chart of an example process for selectively performing idle-mode load balancing, for idle-mode user devices camping on a set of carriers, based on load balancing of connected-mode user devices associated with the set of carriers.

FIG. 4 is a flow chart of an example process 400 for selectively performing idle-mode load balancing, for idle-mode user devices camping on a set of carriers, based on load balancing of connected-mode user devices associated with the set of carriers. In some implementations, one or more process blocks of FIG. 4 may be performed by base station 215. In some implementations, one or more process blocks of FIG. 4 may be performed by another device or a set of devices separate from or including base station 215, such as another device of operator network 220.

As shown in FIG. 4, process 400 may include determining connected-mode information associated with a set of carriers (block 410). For example, base station 215 may determine connected-mode information associated with a set of carriers. In some implementations, base station 215 may determine the connected-mode information when base station 215 receives information indicating that base station 215 is to determine whether load balancing of idle-mode user devices 210 is needed, as described below.

The connected-mode information may include information associated with connected-mode user devices 205 connected to base station 215 via a carrier associated with operator network 220. For example, the connected-mode information may include information that identifies an amount of traffic (e.g., in gigabytes (GB), megabytes (MB), kilobytes (kB), etc.) sent and/or received by base station 215 via the carrier per unit of time (e.g., per hour, per 15 minutes, per second, etc.). In other words, the connected-mode information may include information that identifies a traffic rate associated with the carrier (e.g., an average historical traffic rate, a traffic rate for a most recent time period, etc.).

As another example, the connected-mode information may include information that identifies a number of connected-mode user devices 205 connected to base station 215 via the carrier (e.g., an average historical number of connected-mode user device 205, a number of connected-mode user devices 205 for a most recent time period, etc.).

As another example, the connected-mode information may include information that identifies a relationship between the amount of the traffic, sent and/or received by base station 215 via the carrier, and a total amount of traffic sent and/or received by base station 215 via the set of carriers (e.g., all carriers that may be used by connected-mode user devices 205 to connect to base station 215). As a particular example, base station 215 may determine connected-mode information that identifies a percentage of the total amount of traffic that is sent and/or received via the carrier (i.e., a connected-mode traffic ratio). Additionally, or alternatively, the connected-mode information may include another type of information, associated with connected-mode user devices 205, that is stored or accessible by base station 215.

In some implementations, the connected-mode information for the set of $\aleph$ carriers may be represented as:

$$\{S_i\}_{i=1:\aleph}$$

where $S_i$ represents the connected-mode information for an i-th carrier of the set of $\aleph$ carriers.

In some implementations, base station 215 may determine connected-mode information associated with multiple carriers. For example, assume that a first set of connected-mode user devices 205 is connected to base station 215 via a first carrier with a first bandwidth (e.g., carrier A with a 10 megahertz (MHz) bandwidth), a second set of connected-mode user devices 205 is connected to base station 215 via a second carrier with a second bandwidth (e.g., carrier B with a 10 MHz bandwidth), and a third set of connected-mode user devices 205 is connected to base station 215 via a third carrier with a third bandwidth (e.g., carrier C with a 20 MHz bandwidth).

Here, base station 215 may determine connected-mode information for the first carrier, the second carrier, and the third carrier. For example, base station 215 may determine a traffic rate associated with each of the first carrier, the second carrier, and the third carrier. Additionally, or alternatively, base station 215 may determine a number of connected-mode user devices 205 connected via each of the first carrier, the second carrier, and the third carrier. Additionally, or alternatively, base station 215 may determine a connected-mode traffic ratio for each of the first carrier, the second carrier, and the third carrier. As a particular example, base station 215 may determine connected-mode traffic ratios of 20% for carrier A, 20% for carrier B, and 60% for carrier C (e.g., $S_i=\{20, 20, 60\}$).

In some implementations, base station 215 may determine the connected-mode information based on an indication to determine whether to perform idle-mode load balancing associated with the set of carriers. For example, base station 215 may be configured to determine whether to perform idle-mode load balancing at particular intervals of time (e.g., every five minutes, every 30 minutes, every hour), and may determine the connected-mode information at the intervals of time, accordingly. As another example, base station 215 may be configured to determine whether to perform idle-mode load balancing when (e.g., after, concurrently with, etc.) base station 215 performs connected-mode load balancing associated with the set of carriers.

Additionally, or alternatively, base station 215 may determine the connected-mode information based on information received from another device. For example, base station 215 may determine the connected-mode information when base station 215 receives, from another device (e.g., automatically, based on user input, etc.), an indication to determine whether to perform idle-mode load balancing. As yet another example base station 215 may determine the connected-mode information when base station 215 receives an indication to perform idle-mode load balancing (e.g., when an operator wishes for idle-mode load balancing to be performed).

As further shown in FIG. 4, process 400 may include calculating normalized connected-mode information based on the connected-mode information (block 420). For example, base station 215 may calculate normalized connected-mode information based on the connected-mode information. In some implementations, base station 215 may calculate the normalized connected-mode information after base station 215 determines the connected-mode information associated with the set of carriers.

The normalized connected-mode information may include connected-mode information that has been normalized in order to permit comparison of the connected-mode information to other information. For example, in some implementations, base station 215 may normalize the connected-mode information, and may compare the normalized connected-mode information to normalized idle-mode information for the purpose of determining whether to perform idle-mode load balancing and/or for the purpose of determining a manner in which base station 215 is to perform idle-mode load balancing, as described below.

In some implementations, base station 215 may calculate the normalize connected-mode information based on the connected-mode information. For example, base station 215 may calculate the normalized connected-mode information based on the following equation:

$$\mathcal{B}_i = \frac{S_i}{\sum_{i=1}^{\aleph} S_i}$$

where $\mathcal{B}_i$ represents normalized connected-mode information for an i-th carrier of the set of $\aleph$ carriers, and where $\sum_{i=1}^{\aleph} \mathcal{B}_i = 1$. Continuing with the above example (e.g., $S_i=\{20, 20, 60\}$), the normalized connected-mode information may be calculated as $\mathcal{B}_i=\{0.20, 0.20, 0.60\}$ (e.g., [20/(20+20+60)]=0.20, [20/(20+20+60)]=0.20, [60/(20+20+60)]=0.60).

As further shown in FIG. 4, process 400 may include determining connection initiation information associated with the set of carriers (block 430). For example, base station 215 may determine connection initiation information associated with the set of carriers. In some implementations, base station 215 may determine the connection initiation information when (e.g., before, after, concurrently with, etc.) base station 215 determines the connected-mode information and/or calculates the normalized connected-mode information. Additionally, or alternatively, base station 215 may determine the connected-mode information when base station 215 receives the information indicating that base station 215 is to determine whether to perform idle-mode load balancing of idle-mode user devices 210.

The connection initiation information may include information associated with a number of connections initiated with base station 215 using the carrier during a period of time. For example, the connection initiation information may include information that identifies a number of RRC connections initiated using the carrier during a period of time (e.g., T), such as a most recent five minute period of time, 30 minute period of time, two hour period of time, or the like. In other words, the connection initiation information may include information that identifies a number of connections initiated by idle-mode user devices 210 with base station 215 via the carrier during the period of time. In some implementations, base station 215 may determine the connection initiation information based on information stored or accessible by base station 215 (e.g., when base station 215 is configured to track the number of RRC connections initiated during the period of time). As another example, the connection initiation information may include information that identifies a number of RRC connections established using the carrier during the period of time.

In some implementations, base station 215 may determine connection initiation information associated with multiple carriers. In some implementations, the connection initiation information for the i-th carrier, of the set of $\aleph$ carriers, may be represented as $M_i$. Continuing with the above example, base station 215 may determine connection initiation information indicating that 30 connections were initiated via carrier A during time T, that 40 connections were initiated via carrier B during time T, and that 80 connections were initiated via carrier C during time T (e.g., $M_i=\{30, 40, 80\}$).

As further shown in FIG. 4, process 400 may include determining idle-mode information based on the connection initiation information (block 440). For example, base station 215 may determine idle-mode information based on the connection initiation information. In some implementations, base station 215 may determine the idle-mode information after base station 215 determines the connection initiation information.

The idle-mode information may include information associated with idle-mode user devices 210 estimated to be camping on the carrier associated with operator network 220 (e.g., without a connection to base station 215). For example, the idle-mode information may include an estimated number of idle-mode user devices 210 camping on the carrier. In some implementations, the idle-mode information may include an estimated number of idle-mode user devices 210 since base station 215 may not store, have access to, or be capable of determining an actual number of idle-mode user devices 210 camped on the carrier.

In some implementations, base station 215 may determine the idle-mode information based on an estimation factor (e.g., $k_i$) stored or accessible by base station 215. The estimation factor may include a value that may be used to estimate the idle-mode information based on the connection initiation information. For example, the number of idle-mode user devices 210 camping on the carrier may be assumed to be proportional to the number of connections initiated via the carrier during the period of time. Here, the estimation factor may include a numerical value (e.g., 0.10, 1.50, 12.00, etc.) that may be used to estimate the number of idle-mode user devices 210 camping on the carrier (e.g., by multiplying the connection initiation information, associated with the carrier, by the estimation factor).

In some implementations, the estimation factor may be the same for one or more carriers of the set of carriers. Additionally, or alternatively, the estimation factor may differ between one or more carriers of the set of carriers. In some implementations, base station 215 may determine the estimation factor based on information stored or accessible by base station 215. For example, base station 215 may receive (e.g., from another device, based on user input, etc.) information associated with the estimation factor, and may determine the estimation factor based on receiving the estimation factor.

In some implementations, base station 215 may determine idle-mode information for multiple carriers. In some implementations, the connection initiation information for the i-th carrier, of the set of ℵ carriers, may be represented as $N_i$, where $N_i$ may be determined based on $k_i$ and $M_i$ (e.g., $N_i=K_i \times M_i$). Continuing with the above example, assume that an estimation factor for carrier A is 1.00 (e.g., $k_A=1.00$), an estimation factor for carrier B is 1.20 (e.g., $k_B=1.20$), and an estimation factor for carrier C is 0.95 (e.g., $k_C=0.95$). Here, base station 215 may determine idle-mode information indicating that 30 idle-mode user devices 210 are camping on carrier A (e.g., $N_A=k_A \times M_A=1.00 \times 30=30$), that 48 idle-mode user devices 210 are camping on carrier B (e.g., $N_B=k_B \times M_B=1.20 \times 40=48$), and that 76 idle-mode user devices 210 are camping on carrier C (e.g., $N_C=k_C \times M_C=0.95 \times 80=76$) (i.e., $N_i=\{30, 48, 76\}$).

As further shown in FIG. 4, process 400 may include calculating normalized idle-mode information based on the idle-mode information (block 450). For example, base station 215 may calculate normalized idle-mode information based on the idle-mode information. In some implementations, base station 215 may calculate the normalized idle-mode information after base station 215 determines the idle-mode information associated with the set of carriers.

The normalized idle-mode information may include idle-mode information that has been normalized in order to permit comparison of the idle-mode information to other information. For example, in some implementations, base station 215 may normalize the idle-mode information, and may compare the normalized idle-mode information to the normalized connected-mode information for the purpose of determining whether to perform idle-mode load balancing and/or for the purpose of determining a manner in which idle-mode load balancing is to be performed, as described below.

In some implementations, base station 215 may calculate the normalize idle-mode information based on the idle-mode information. For example, base station 215 may calculate the normalized idle-mode information based on the following equation:

$$\mathcal{D}_i = \frac{N_i}{\sum_{i=1}^{\aleph} N_i}$$

where $\mathcal{D}_i$ represents normalized idle-mode information for an i-th carrier of the set of ℵ carriers, and $\sum_{i=1}^{\aleph} \mathcal{D}_i=1$. Continuing with the above example, base station 215 may calculate the normalized idle-mode information as $\mathcal{D}_i=\{0.20, 0.31, 0.49\}$ (e.g., $[30/(30+48+76)]=0.20$, $[48/(30+48+76)]=0.31$, $[76/(30+48+76)]=0.49$).

As further shown in FIG. 4, process 400 may include determining whether to perform idle-mode load balancing based on the normalized connected-mode information and the normalized idle-mode information (block 460). For example, base station 215 may determine whether to perform idle-mode load balancing based on the normalized connected-mode information and the normalized idle-mode information. In some implementations, base station 215 may determine whether to perform idle-mode load balancing based on the normalized connected-mode information and the normalized idle-mode information after base station 215 calculates the normalized connected-mode information and the normalized idle-mode information.

In some implementations, base station 215 may determine whether to perform idle-mode load balancing based on comparing the normalized connected-mode information and the normalized idle-mode information. For example, base station 215 may determine whether a difference (e.g., $O_i$) between normalized connected-mode information, associated with the carrier, and normalized idle-mode information, associated with the carrier, satisfies a load balancing threshold based on the following equation:

$$O_i = |\mathcal{B}_i - \mathcal{D}_i| \geq \Delta_i$$

where $\Delta_i$ represents the load balancing threshold for the i-th carrier. Here, the load balancing threshold may prevent base station 215 from performing idle-mode load balancing when the difference between the normalized connected-mode information and the normalized idle-mode information is less than the threshold (e.g., in order to prevent idle-mode load balancing for insignificant differences between the normalized connected-mode information and the normalized idle-mode information). In some implementations, the load balancing threshold may be the same for one or more carriers of the set of carriers. Additionally, or alternatively, the balancing threshold may differ between one or more carriers of the set of carriers.

In some implementations, base station 215 may compare the normalized connected-mode information and the normalized idle-mode information for each carrier separately. Continuing with the above example, assume that $\Delta_A=\Delta_B=\Delta_C=0.05$. Here, base station 215 may calculate the differences between the normalized connected-mode information and the normalized idle-mode information as $O_i=\{0.00, 0.11, 0.11\}$ (e.g., $|0.20-0.20|=0.00$, $|0.20-0.31|=0.11$, $|0.60-0.49|=0.11$). In this example, base station 215 may determine that idle-mode load balancing should be performed for carrier B (e.g., since $O_B=0.11 \geq 0.05=\Delta_B$) and carrier C (e.g., since $O_C=0.11 \geq 0.05=\Delta_C$). Similarly, base station 215 may determine that idle-mode load balancing need not be performed for carrier A (e.g., since $O_A=0.00<0.05=\Delta_A$).

In some implementations, base station 215 may determine whether to perform idle-mode load balancing based on a set of balancing thresholds corresponding to the set of carriers, as described in the above example. Additionally, or alternatively, base station 215 may determine whether to perform idle-mode load balancing based on an overall balancing threshold (e.g., $\Delta_{ABC}$) associated with the set of carriers. For example, assume that $\Delta_{ABC}=0.15$. Here, base station 215 may calculate a sum of the differences between the normalized connected-mode information and the normalized idle-mode information as $O_{ABC}=0.22$ (e.g., $|0.20-0.20|+|0.20-0.31|+|0.60-0.49|=0.22$). In this example, base station 215 may determine that idle-mode load balancing should be performed for one or more of the carriers (e.g., since $O_{ABC}=0.22 \geq 0.15=\Delta_{ABC}$).

In some implementations, base station 215 may determine whether to perform idle-mode load balancing based on a time threshold (e.g., five minutes, 30 minutes, etc.). For example, assume that base station 215 determines that idle-mode load balancing is to be performed for the one or more carriers, as described above. Here, base station 215 may determine (e.g., based on a timer, based on stored information, etc.) an amount of time since idle-mode load balancing was last performed, and may compare the amount of time to the time threshold. In this example, if the amount of time satisfies the time threshold (e.g., if the amount of time since the last idle-mode load balancing is greater than or equal to the time threshold), then base station 215 may perform the idle-mode load balancing. Alternatively, if the amount of time does not satisfy the time threshold (e.g., if the amount of time since the last idle-mode load balancing is less than the time threshold), then base station 215 may not perform the idle-mode load balancing. In some implementations, the time threshold may prevent base station 215 from performing idle-mode load balancing in order to reduce resource usage associated with idle-mode load balancing.

As further shown in FIG. 4, process 400 may include selectively performing the idle-mod load balancing (block 470). For example, base station 215 may selectively perform the idle-mode load balancing. In some implementations, base station 215 may selectively perform the idle-mode load balancing based on determining whether to perform the idle-mode load balancing.

In some implementations, if base station 215 determines that idle-mode load balancing should be performed for one or more carriers, base station 215 may perform idle-mode load balancing for the one or more carriers. Continuing with the above example, assume that base station 215 determines that idle-mode load balancing is to be performed for one or more carriers (e.g., based on determining that $O_{ABC}=0.22 \geq 0.15 = \Delta_{ABC}$). Here, base station 215 may perform the idle-mode load balancing based on the normalized connected-mode information and the normalize idle-mode information.

For example, base station 215 may determine that the carrier A normalized connected-mode information matches the carrier A normalized idle-mode information (e.g., 0.20–0.20=0.00), that the carrier B normalized connected-mode information is less than the carrier B normalized idle-mode information (e.g., 0.20–0.31=–0.11), and that the carrier C normalized connected-mode information is greater than the carrier C normalized idle-mode information (e.g., 0.60–0.49=0.11). In other words, base station 215 may determine that a number of idle-mode user devices 210 camping on carrier B should be decreased, while a number of idle-mode user devices 210 camping on carrier C should be increased (e.g., in order to match the connected-mode load balancing of connected-mode user devices 205 across the carriers). Here, base station 215 may perform idle-mode load balancing by causing a number of idle-mode user devices 210 (e.g., $n_B$) camping on carrier B to be reallocated to carrier C such that the load balancing of idle-mode user devices 210 matches (e.g., exactly, within a threshold, etc.) the load balancing of connected-mode user devices 205. For example, base station 215 may cause 18 idle-mode user devices 210 camping on carrier B to be reallocated to carrier C (e.g., where $(48-n_B)/(30+48+76)=0.20 \rightarrow n_B=18$). In this way, base station 215 may determine whether to perform idle-mode load balancing based on load balancing of connected-mode user devices 205, and may perform the idle-mode load balancing of idle-mode user devices 210 based on the load balancing of connected-mode user devices 205 as needed.

Alternatively, if base station 215 determines that idle-mode load balancing should not be performed for the one or more carriers, base station 215 may not perform idle-mode load balancing. In some implementations, base station 215 may repeat process 400 (e.g., at intervals of time, based on an indication, etc.).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may allow a base station to determine whether to perform idle-mode load balancing, associated with idle-mode user devices camping on multiple carriers of an operator network, based on a load balancing of connected-mode user devices associated with the multiple carriers, and perform idle-mode load balancing as needed. Basing the idle-mode load balancing on the load balancing of the connected-mode user devices may lead to improved operator network performance by, for example, reducing congestion associated with providing the idle-mode user devices with access to the operator network, reducing blocking of the idle-mode user devices from accessing the operator network, reducing a number of inter-frequency handovers between the multiple carriers (e.g., when the idle-mode user devices become connected-mode user devices), or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A base station, comprising:
one or more processors to:
determine connected-mode information associated with a plurality of carriers,
the connected-mode information being associated with a plurality of connected-mode user devices connected to the base station via the plurality of carriers;
determine idle-mode information associated with the plurality of carriers,
the idle-mode information being associated with a plurality of idle-mode user devices estimated to be camping on the plurality of carriers;
determine a difference between the connected-mode information and the idle-mode information;
determine that the difference satisfies a threshold;
determine, based on determining that the difference satisfies the threshold, that idle-mode load balancing is to be performed in association with two or more carriers of the plurality of carriers; and
perform the idle-mode load balancing for the two or more carriers,
the idle-mode load balancing being performed such that a load balancing of the plurality of idle-mode user devices matches a load balancing of the plurality of connected-mode user devices.

2. The base station of claim 1, where the one or more processors, when determining the idle-mode information, are to:
determine an estimation factor associated with the plurality of carriers; and
determine the idle-mode information based on the estimation factor.

3. The base station of claim 1, where the one or more processors, when determining the difference between the connected-mode information and the idle-mode information, are to:
determine a first difference between a first portion of the connected-mode information and a first portion of the idle-mode information,
the first portion of the connected-mode information and the first portion of the idle-mode information being associated with a first carrier of the plurality of carriers;
determine a second difference between a second portion of the connected-mode information and a second portion of the idle-mode information,
the second portion of the connected-mode information and the second portion of the idle-mode information being associated with a second carrier of the plurality of carriers;
where the one or more processors are further to:
combine the first difference and the second difference to determine a total difference;
where the one or more processors, when determining that the difference satisfies the threshold, are to:
determine that the total difference satisfies the threshold; and
where the one or more processors, when determining that the idle-mode load balancing is to be performed, are to:
determine that the idle-mode load balancing is to be performed based on determining that the total difference satisfies the threshold.

4. The base station of claim 1, where the one or more processors, when determining the idle-mode information, are to:
determine information associated with the plurality of carriers and relating to the plurality of idle-mode user devices; and
calculate normalized idle-mode information, as the idle-mode information, based on the determined information associated with the plurality of carriers and relating to the plurality of idle-mode user devices.

5. The base station of claim 1, where the one or more processors are further to:
determine connection initiation information that includes information that identifies a number of connections initiated with the base station during a period of time; and
where the one or more processors, when determining the idle-mode information, are to:
determine the idle-mode information based on the connection initiation information.

6. The base station of claim 1, where the threshold is a first threshold;
where the one or more processors are further to:
identify an amount of time since a previous performance of idle-mode load balancing; and
determine that the amount of time satisfies a second threshold; and
where the one or more processors, when determining that the idle-mode load balancing is to be performed, are to:
determine that the idle-mode load balancing is to be performed based on determining that the amount of time satisfies the second threshold.

7. The base station of claim 1, where the one or more processors are further to:
receive information indicating that the base station is to determine whether the idle-mode load balancing is needed; and
where the one or more processors, when determining the connected-mode information, are to:
determine the connected-mode information based on receiving the information indicating that the base station is to determine whether the idle-mode load balancing is needed.

8. A non-transitory computer-readable medium storing instructions, the instructions comprising:
one or more instructions that, when executed by one or more processors, cause the one or more processors to:
determine connected-mode information associated with a plurality of connected-mode user devices connected to a base station via a plurality of carriers;

normalize the connected-mode information to create normalized connected-mode information;
determine idle-mode information associated with a plurality of idle-mode user devices estimated to be camping on the plurality of carriers;
normalize the idle-mode information to create normalized idle-mode information;
determine a difference between the normalized connected-mode information and the normalized idle-mode information;
determine that the difference satisfies a threshold;
determine, based on determining that the difference satisfies the threshold, that idle-mode load balancing is to be performed for at least two carriers of the plurality of carriers; and
perform the idle-mode load balancing with regard to the plurality of idle-mode user devices.

9. The non-transitory computer-readable medium of claim 8, where the one or more instructions, that cause the one or more processors to determine the idle-mode information, cause the one or more processors to:
determine an estimation factor associated with the plurality of carriers; and
combine connection initiation information and the estimation factor to determine the idle-mode information.

10. The non-transitory computer-readable medium of claim 8, where the one or more instructions, when executed by the one or more processors further cause the one or more processors to:
determine connection initiation information that includes information that identifies a number of connections initiated with the base station during a period of time; and
where the one or more instructions, that cause the one or more processors to determine the idle-mode information, cause the one or processors to:
determine the idle-mode information based on the connection initiation information.

11. The non-transitory computer-readable medium of claim 8, where the connected-mode information includes information that identifies at least one of:
an amount of traffic sent or received by the base station via each carrier of the plurality of carriers;
a number of the plurality of connected-mode user devices connected to the base station via each carrier of the plurality of carriers; or
a relationship between an amount of the traffic, sent or received by the base station via each carrier of the plurality of carriers, and a total amount of traffic sent or received by the base station via the plurality of carriers.

12. The non-transitory computer-readable medium of claim 8, where the idle-mode information includes information that identifies a number of the plurality of idle-mode user devices estimated to be camping on each carrier of the plurality of carriers.

13. The non-transitory computer-readable medium of claim 8, where the threshold is a first threshold;
where the one or more instructions, when executed by the one or more processors, further cause the one or more processors to:
identify an amount of time since a previous performance of idle-mode load balancing; and
determine that the amount of time satisfies a second threshold; and
where the one or more instructions, that cause the one or more processors to determine that the idle-mode load balancing is to be performed, cause the one or more processors to:
determine that the idle-mode load balancing is to be performed based on determining that the amount of time satisfies the second threshold.

14. The non-transitory computer-readable medium of claim 8, where the one or more instructions, when executed by the one or more processors, further cause the one or more processors to:
determine connection initiation information associated with the plurality of carriers; and
where the one or more instructions, that cause the one or more processors to determine idle-mode information, cause the one or more processors to:
determine the idle-mode information based on the connection initiation information.

15. A method, comprising:
determining, by a device, first information associated with a plurality of carriers,
the first information being associated with a plurality of user devices connected to a base station via the plurality of carriers;
determining, by the device, second information associated with the plurality of carriers,
the second information being associated with a plurality of user devices camping on the plurality of carriers; and
determining, by the device, a difference between the first information and the second information;
determining, by the device, that the difference satisfies a threshold; and
selectively performing, by the device, load balancing in association with the plurality of user devices camping on the plurality of carriers based on the difference satisfying the threshold.

16. The method of claim 15, further comprising:
determining an estimation factor associated with the plurality of carriers; and
where determining the second information comprises:
determining the second information based on the estimation factor.

17. The method of claim 15, where determining the difference between the first information and the second information comprises:
determining a first difference between a first portion of the first information and a first portion of the second information,
the first portion of the first information and the first portion of the second information being associated with a first carrier of the plurality of carriers;
determining a second difference between a second portion of the first information and a second portion of the second information,
the second portion of the first information and the second portion of the second information being associated with a second carrier of the plurality of carriers;
where the method further comprises:
combining the first difference and the second difference to determine a total difference;
where determining that the difference satisfies the threshold comprises:
determining that the total difference satisfies the threshold; and where selectively performing the load balancing comprises:
    selectively performing the load balancing based on determining that the total difference satisfies the threshold.

18. The method of claim 15, where the second information includes information that identifies a number of the plurality of user devices camping on each carrier of the plurality of carriers.

19. The method of claim 15, further comprising:
    identifying an amount of time since a previous performance of load balancing of user devices camping on the plurality of carriers;
    determining that the amount of time satisfies a time threshold; and
    determining that the load balancing is to be performed based on determining that the amount of time satisfies the time threshold.

20. The method of claim 15, further comprising:
    identifying an amount of time since a previous performance of load balancing of user devices camping on the plurality of carriers; and
    determining that the amount of time does not satisfy a time threshold; and
    where selectively performing the load balancing in association with the plurality of user devices camping on the plurality of carriers comprises:
    not performing the load balancing in association with the plurality of user devices camping on the plurality of carriers based on the amount of time not satisfying the time threshold.

* * * * *